United States Patent
Hunt (10) Patent No.: US 9,930,385 B2
(45) Date of Patent: *Mar. 27, 2018

(54) VARIABLE BIT VIDEO STREAMS FOR ADAPTIVE STREAMING

(71) Applicant: NETFLIX, INC, Los Gatos, CA (US)

(72) Inventor: Neil D. Hunt, Los Altos, CA (US)

(73) Assignee: NETFLIX, INC., Los Gatos, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 14/670,194

(22) Filed: Mar. 26, 2015

(65) Prior Publication Data

US 2015/0201226 A1 Jul. 16, 2015

Related U.S. Application Data

(63) Continuation of application No. 13/011,242, filed on Jan. 21, 2011, now Pat. No. 8,997,160, which is a
(Continued)

(51) Int. Cl.
*H04N 21/238* (2011.01)
*H04N 21/2365* (2011.01)
(Continued)

(52) U.S. Cl.
CPC ..... *H04N 21/23655* (2013.01); *H04N 21/238* (2013.01); *H04N 21/2383* (2013.01);
(Continued)

(58) Field of Classification Search
CPC ............. H04N 21/238; H04N 21/2385; H04N 21/2402; H04N 21/2662; H04N 21/44209
See application file for complete search history.

(56) References Cited

U.S. PATENT DOCUMENTS

| 2003/0165150 A1* | 9/2003 | Zimmermann ... H04L 29/06027 370/412 |
| 2005/0066063 A1* | 3/2005 | Grigorovitch ......... H04N 7/163 710/1 |

(Continued)

FOREIGN PATENT DOCUMENTS

| EP | 1672925 A1 | 6/2006 |
| EP | 2257073 A1 | 12/2010 |

OTHER PUBLICATIONS

Extended European Search Report for Application No. 12736924.7 dated Mar. 25, 2015.
Zambelli, "IIS Smooth Streaming Technical Overview", Microsoft Corporation, Mar. 31, 2009, 17 pages.

*Primary Examiner* — Robert Hance
(74) *Attorney, Agent, or Firm* — Artegis Law Group, LLP (57) ABSTRACT

One embodiment of the present invention sets forth a technique for adapting playback bit rate in a content delivery system based on scene complexity of the video content as well as network conditions and other performance factors. A scene complexity map of the video content indicates the complexity levels of different scenes within the video content. Using the scene complexity map, a content player may download scenes of lower scene complexity levels from video streams encoded to lower bit rates to manage the bandwidth consumed to download the video content and allow for the downloading of scenes of higher complexity levels from video streams encoded to higher bit rates.

20 Claims, 8 Drawing Sheets

| | High Complexity | Medium Complexity | Low Complexity | Estimated Bandwidth | Selected Stream |
|---|---|---|---|---|---|
| Scene 704(0) | | X | | Medium | Medium |
| Scene 704(1) | | | X | High | Low |
| Scene 704(2) | X | | | Medium | High |
| Scene 704(3) | X | | | Medium | High |
| Scene 704(4) | | X | | Medium | Low |
| Scene 704(5) | | X | | Medium | Low |
| Scene 704(6) | X | | | Medium | High |
| Scene 704(7) | X | | | Medium | High |
| Scene 704(8) | X | | | Medium | Medium |
| Scene 704(9) | | | X | Medium | Low |

Scene Complexity Map 700 / Estimated Bandwidth 710 / Selected Stream 720

Related U.S. Application Data continuation-in-part of application No. 12/961,375, filed on Dec. 6, 2010, now Pat. No. 8,689,267.

(51) Int. Cl.

| | | |
|---|---|---|
| *H04N 21/2385* | (2011.01) | |
| *H04N 21/2343* | (2011.01) | |
| *H04N 21/24* | (2011.01) | |
| *H04N 21/845* | (2011.01) | |
| *H04N 21/442* | (2011.01) | |
| *H04N 21/6373* | (2011.01) | |
| *H04N 21/6377* | (2011.01) | |
| *H04N 21/2383* | (2011.01) | |
| *H04N 21/239* | (2011.01) | |
| *H04N 21/2662* | (2011.01) | |
| *H04N 21/647* | (2011.01) | |
| *H04N 5/76* | (2006.01) | |

(52) U.S. Cl.
CPC ..... *H04N 21/2385* (2013.01); *H04N 21/2393* (2013.01); *H04N 21/23439* (2013.01); *H04N 21/2402* (2013.01); *H04N 21/2662* (2013.01); *H04N 21/44209* (2013.01); *H04N 21/6373* (2013.01); *H04N 21/6377* (2013.01); *H04N 21/64769* (2013.01); *H04N 21/8456* (2013.01); *H04N 5/76* (2013.01)

(56) References Cited

U.S. PATENT DOCUMENTS

| | | | |
|---|---|---|---|
| 2007/0157234 | A1 | 7/2007 | Walker |
| 2008/0192820 | A1* | 8/2008 | Brooks .............. H04N 7/17318 375/240.02 |
| 2008/0273591 | A1* | 11/2008 | Brooks ................ H04N 7/1675 375/240.01 |
| 2009/0172167 | A1* | 7/2009 | Drai ...................... H04L 45/125 709/226 |
| 2009/0300203 | A1* | 12/2009 | Virdi .................. H04N 21/2358 709/231 |
| 2009/0300204 | A1* | 12/2009 | Zhang ................ H04N 21/2358 709/231 |
| 2009/0307367 | A1* | 12/2009 | Gigliotti ................. G06F 15/16 709/231 |
| 2009/0307368 | A1 | 12/2009 | Sriram et al. |
| 2010/0011117 | A1* | 1/2010 | Hristodorescu .......... H04N 7/24 709/231 |
| 2010/0017439 | A1 | 6/2010 | Chen et al. |
| 2010/0186025 | A1* | 7/2010 | Thomas ................ G06F 3/0481 725/5 |
| 2010/0189183 | A1 | 7/2010 | Gu et al. |
| 2011/0082945 | A1* | 4/2011 | Myers ............ H04N 21/234327 709/231 |
| 2011/0122939 | A1* | 5/2011 | Ganesan ............ H04N 19/115 375/240.01 |
| 2012/0023155 | A1* | 1/2012 | Myers ............ H04N 21/234327 709/203 |

* cited by examiner

Scene Complexity Map 302

| | High Complexity | Medium Complexity | Low Complexity |
|---|---|---|---|
| Scene 304(0) | | X | |
| Scene 304(1) | | | X |
| Scene 304(2) | X | | |
| Scene 304(3) | X | | |
| Scene 304(4) | | X | |

Scene Complexity Map
700

| | High Complexity | Medium Complexity | Low Complexity |
|---|---|---|---|
| Scene 704(0) | | X | |
| Scene 704(1) | | | X |
| Scene 704(2) | X | | |
| Scene 704(3) | X | | |
| Scene 704(4) | | X | |
| Scene 704(5) | | X | |
| Scene 704(6) | X | | |
| Scene 704(7) | X | | |
| Scene 704(8) | X | | |
| Scene 704(9) | | | X |

Estimated Bandwidth 710    Selected Stream 720

| Estimated Bandwidth | Selected Stream |
|---|---|
| Medium | Medium |
| High | Low |
| Medium | High |
| Medium | High |
| Medium | Low |
| Medium | Low |
| Medium | High |
| Medium | High |
| Medium | Medium |
| Medium | Low |

VARIABLE BIT VIDEO STREAMS FOR ADAPTIVE STREAMING

CROSS-REFERENCE TO RELATED APPLICATION

This application is a continuation of U.S. patent application Ser. No. 13/011,242, titled "VARIABLE BIT VIDEO STREAMS FOR ADAPTIVE STREAMING" and filed Jan. 21, 2011, which is a continuation-in-part of U.S. patent application Ser. No. 12/961,375, titled "VARIABLE BIT VIDEO STREAMS FOR ADAPTIVE STREAMING" and filed Dec. 6, 2010. The entirety of each of these related applications is hereby incorporated herein by reference.

BACKGROUND OF THE INVENTION

Field of the Invention

Embodiments of the present invention relate generally to digital media and, more specifically, to variable bit video streams for adaptive streaming.

Description of the Related Art

Digital content distribution systems conventionally include a content server, a content player, and a communications network connecting the content server to the content player. The content server is configured to store digital content files, which can be downloaded from the content server to the content player. Each digital content file corresponds to a specific identifying title, such as "Gone with the Wind," which is familiar to a user. The digital content file typically includes sequential content data, organized according to playback chronology, and may comprise audio data, video data, or a combination thereof.

The content player is configured to download and play a digital content file, in response to a user request selecting the title for playback. The process of playing the digital content file includes decoding and rendering audio and video data into an audio signal and a video signal, which may drive a display system having a speaker subsystem and a video subsystem. Playback typically involves a technique known in the art as "streaming," whereby the content server sequentially transmits the digital content file to the content player, and the content player plays the digital content file while content data is received that comprises the digital content file. To account for variable latency and bandwidth within the communications network, a content buffer queues the incoming content data ahead of the content data actually being played. During moments of network congestion, which leads to lower available bandwidth, less content data is added to the content buffer, which may drain down as content data is being de-queued to support playback at a certain playback bit rate. However, during moments of high network bandwidth, the content buffer is replenished and additional buffer time is added until the content buffer is generally full again. In practical systems, the content buffer may queue content data corresponding to a time span ranging from seconds to more than a minute.

Each digital content file stored on the content server is typically encoded for a specific playback bit rate. Prior to initiating playback, the content player may measure available bandwidth from the content server and select a digital content file having an bit rate that can be supported by the measured available bandwidth. To maximize playback quality, a digital content file with the highest bit rate not exceeding the measured bandwidth is conventionally selected. To the extent the communications network can provide adequate bandwidth to download the selected digital content file while satisfying bit rate requirements, playback proceeds satisfactorily. In practice, however, available bandwidth in the communications network is constantly changing as different devices connected to the communications network perform independent tasks.

To counter the variability of network conditions, adaptive streaming may be implemented where, for each title, multiple video streams having different bit rates exist. As the network conditions vary, the content player may switch between video streams according to the network conditions. For example, video data may be downloaded from video streams encoded to higher bit rates when the network conditions are good, and, when the network conditions deteriorate, subsequent video data may be downloaded from video streams encoded to lower bit rates.

A problem arises with implementing an adaptive streaming solution when the video streams are encoded using a variable bit rate (VBR) technique. In a VBR video stream, to optimize the utilization of bandwidth or space used by a file, different video scenes are encoded based on the complexity of those video scenes. A scene of low complexity is encoded to a lower bit rate to "save" bits for scenes having a higher complexity. The average bit rate across a VBR video stream is, thus, not reflective of the bit rate of a particular scene within the VBR video stream. This poses a problem when implementing adaptive streaming because the content player selects an encoded video stream based on the average bit rate, but the specific portions of video data downloaded from the encoded video stream may be encoded to a bit rate that is much higher or much lower than the average bit rate. In such a scenario, switching between encoded video streams may not be appropriate or effective, thus reducing the overall quality of the playback.

As the foregoing illustrates, what is needed in the art is an approach for downloading digital content to a content player based on the scene complexity of the digital content.

SUMMARY OF THE INVENTION

One embodiment of the present invention sets forth a method for adaptively downloading digital video content. The method comprises the steps of receiving a scene complexity map associated with the digital video content and specifying a complexity level associated with one or more portions of the digital video content. A plurality of encoded video streams associated with the digital video content are identified, where each encoded video stream is associated with a different bit rate and includes an encoded portion encoded to the different bit rate for each of the one or more portions of the digital video content. An estimated bandwidth for a first time window is computed based on the actual bandwidth for downloading the digital video content over one or more time windows. The complexity level associated with a first portion of the digital video content and a second portion of the digital video content is determined based on the scene complexity map. During playback of a different portion of the digital video content, a first encoded video stream included in the plurality of encoded video streams from which to download a first encoded portion corresponding to the first portion of the digital video content is selected based on the estimated bandwidth, the first complexity level, and the second complexity level. The first encoded portion is downloaded for playback from the first encoded video stream to a content buffer residing within a content player device.

One advantage of the disclosed technique is that a variable bit encoded stream is dynamically generated by the content player device at playback time by selecting portions of video data from different constant bit rate encoded streams based on the complexity levels of the portions of video data. Such a technique allows for optimizing the playback of the video data and generating the highest playback quality video stream based on the current conditions and scene complexities.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
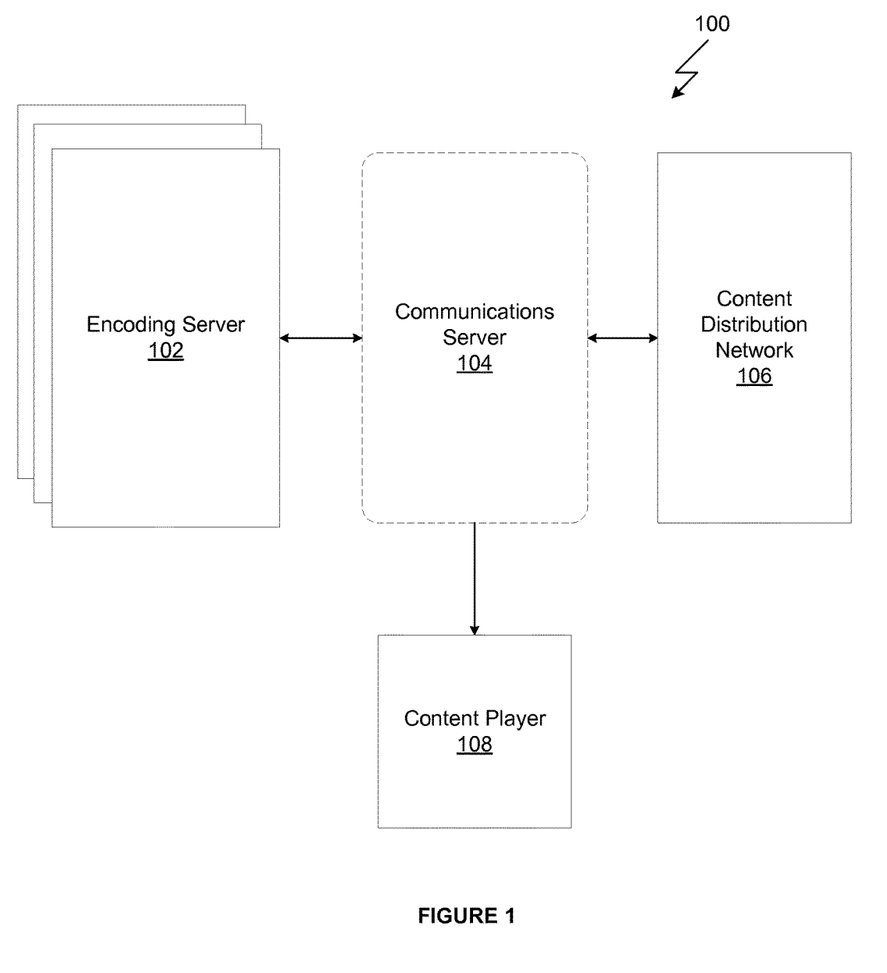
FIG. 1 illustrates a content distribution system configured to implement one or more aspects of the present invention.

FIG. 1 illustrates a content distribution system 100 configured to implement one or more aspects of the invention. As shown, the content distribution system 100 includes an encoding server 102, a communications network 104, a content distribution network (CDN) 106 and a content player 108.

The communications network 104 includes a plurality of network communications systems, such as routers and switches, configured to facilitate data communication between the encoding server 102, the CDN 106 and the content player 108. Persons skilled in the art will recognize that many technically feasible techniques exist for building the communications network 104, including technologies practiced in deploying the well-known internet communications network.

The encoding server 102 is a computer system configured to encode video streams associated with digital content files for adaptive streaming. The encoding workflow for encoding the video streams for adaptive streaming is described in greater detail below with respect to FIGS. 2 and 3. The content distribution system 100 maybe include one or more encoding servers 102, where each encoding server 102 is configured to perform all the functions needed to encode the video streams or where each encoding server 102 is configured to perform a particular function needed to encode the video streams. The digital content files including the encoded video streams are retrieved by the CDN 106 via the communications network 104 for distribution to the content player 108.

The CDN 106 comprises one or more computer systems configured to serve download requests for digital content files from the content player 108. The digital content files may reside on a mass storage system accessible to the computer system. The mass storage system may include, without limitation, direct attached storage, network attached file storage, or network attached block-level storage. The digital content files may be formatted and stored on the mass storage system using any technically feasible technique. A data transfer protocol, such as the well-known hyper-text transfer protocol (HTTP), may be used to download digital content files from the content server 106 to the content player 108.

The content player 108 may comprise a computer system, a set top box, a mobile device such as a mobile phone, or any other technically feasible computing platform that has network connectivity and is coupled to or includes a display device and speaker device for presenting video frames, and generating acoustic output, respectively. The content player 108 is configured for adaptive streaming, i.e., to download units of a video stream encoded to a specific playback bit rate, and switch to downloading subsequent units of a video stream encoded to a different playback bit rate based on prevailing bandwidth conditions within the communications network 104. As bandwidth available within the communications network 104 becomes limited, the content player 108 may select a video stream encoded to a lower playback bit rate. As the bandwidth increases, a video stream encoded to a higher playback bit rate may be selected.

Although, in the above description, the content distribution system 100 is shown with one content player 108 and one CDNs 106, persons skilled in the art will recognize that the architecture of FIG. 1 contemplates only an exemplary embodiment of the invention. Other embodiments may include any number of content players 108 and/or CDNs 106. Thus, FIG. 1 is in no way intended to limit the scope of the present invention in any way.

Figure 2:
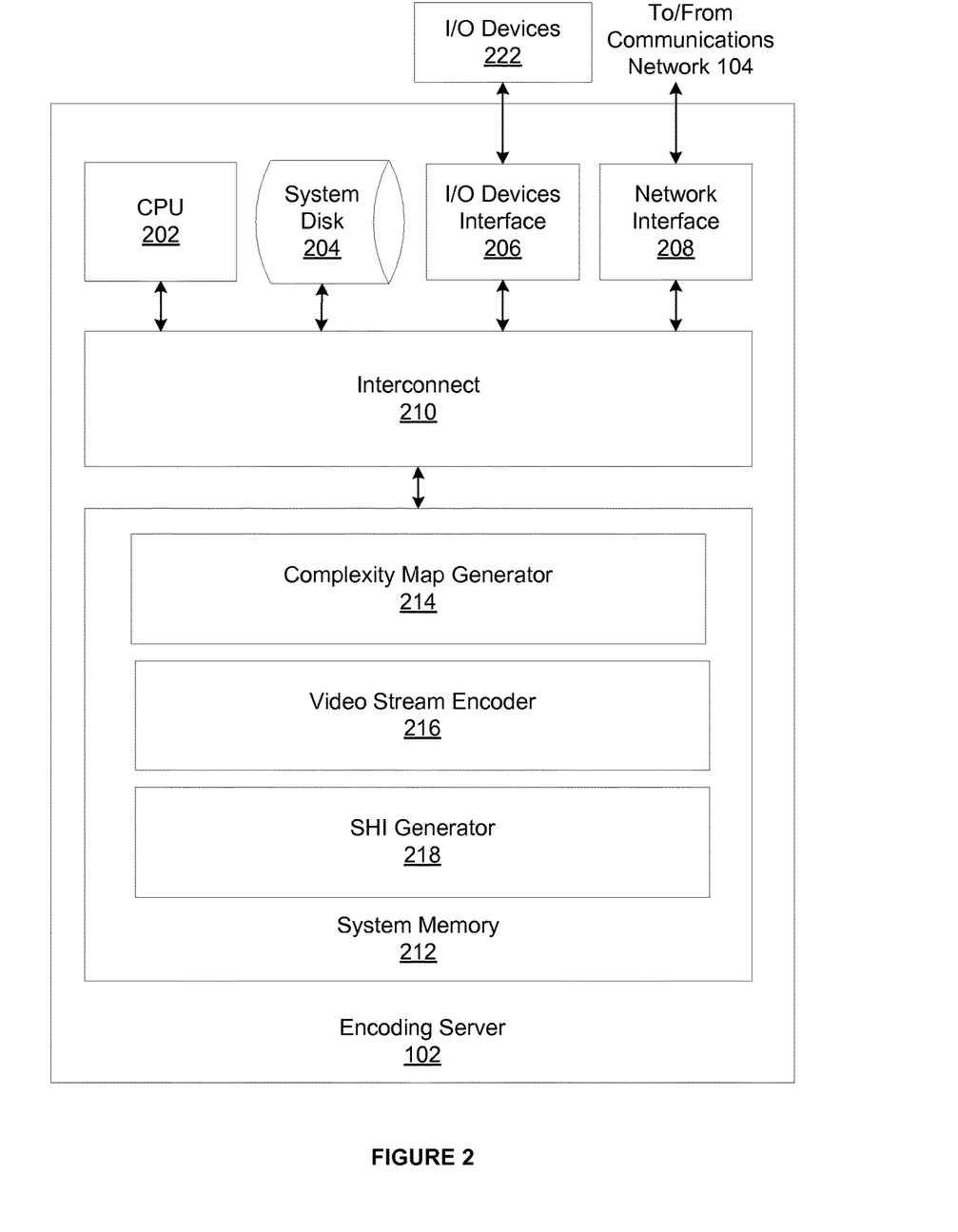
FIG. 2 is a more detailed view of the encoding server of FIG. 1, according to one embodiment of the invention.

FIG. 2 is a more detailed illustration of the encoding server 102 of FIG. 1, according to one embodiment of the invention. As shown, the encoding server 102 includes a central processing unit (CPU) 202, a system disk 204, an input/output (I/O) devices interface 206, a network interface 208, an interconnect 210 and a system memory 212.

The CPU 202 is configured to retrieve and execute programming instructions stored in the system memory 212. Similarly, the CPU 202 is configured to store application data and retrieve application data from the system memory 212. The interconnect 210 is configured to facilitate transmission of data, such as programming instructions and application data, between the CPU 202, the system disk 204, I/O devices interface 206, the network interface 208, and the system memory 212. The I/O devices interface 206 is configured to receive input data from I/O devices 222 and transmit the input data to the CPU 202 via the interconnect 210. For example, I/O devices 222 may comprise one or more buttons, a keyboard, and a mouse or other pointing device. The I/O devices interface 206 is also configured to receive output data from the CPU 202 via the interconnect 210 and transmit the output data to the I/O devices 222. The system disk 204, such as a hard disk drive or flash memory storage drive or the like, is configured to store non-volatile data such as encoded video streams. The encoded video streams can then be retrieved by the CDN 106 via the communications network 104. The network interface 218 is coupled to the CPU 202 via the interconnect 210 and is configured to transmit and receive packets of data via the communications network 104. In one embodiment, the network interface 208 is configured to operate in compliance with the well-known Ethernet standard.

The system memory 212 includes software components that include instructions for encoding one or more video streams associated with a specific content title for adaptive streaming. As shown, these software components include a complexity map generator 214, a video stream encoder 216, and a sequence header index (SHI) generator 218.

For a particular video stream, the complexity map generator 214 analyzes the video stream to determine the complexity of the video content within different portions of the video stream (referred to herein as "scenes"). A complex scene is, typically, a scene that changes significantly frame-over-frame, for example a car crash scene in an action movie. Conversely, a simple scene is, typically, a scene with not many changes frame-over-frame, for example a scene of a still body of water at night. The complexity generator 214 may analyze the video stream based on pre-determined heuristics information. Based on the analysis, the complexity map generator 214 generates a scene complexity map that is described in greater detail below with respect to FIG. 3.

The video stream encoder 216 executes encoding operations for encoding a video stream to a specific playback bit rate such that the encoded video stream complies with a particular video codec standard, such as VC1, and is configured for adaptive streaming. In an alternative embodiment, the video stream can be encoded to comply with a different video codec standard such as MPEG or H.264. In operation, for a particular video stream, the video stream encoder 216 encodes the video stream to different constant bitrates to generate multiple encoded video streams, each encoded video stream associated with a different constant bitrate and, thus, having a different quality. An encoded video stream generated by the video stream encoder 216 includes a sequence of groups of pictures (GOPs), each GOP comprising multiple frames of video data.

The SHI generator 218 generates a sequence header index associated with each encoded video stream. To generate the sequence header index, the SHI generator 218 first searches the encoded video stream for the key frames associated with the different GOPs included in the encoded video stream. The key frames can be located by the SHI generator 218 based on the sequence start codes specified in the sequence headers included in the key frames. For the GOP associated with each of the identified key frames, the SHI generator 218 defines a switch point within the sequence header index that stores (i) a data packet number that indentifies the data packet that includes the key frame associated with the GOP and (ii) the playback offset associated with the GOP. Again, the playback offset associated with the GOP is determined based on the location of the GOP in the sequence of GOPs included in the encoded video stream.

The encoding server 102 may generate multiple encoded video streams associated with the same content title and encoded to different playback bit rates in the manner described above. The encoding process described herein ensures that, across the different encoded video streams the GOPs are associated with the same playback time interval and that corresponding GOPs across the different encoded video streams are associated with the same playback offsets. Therefore, each switch point defined in a sequence header included in one of the encoded video stream associated with a specific content title has a corresponding switch point defined in a sequence header included in each of the other encoded video stream associated with the same content title.

Based on the sequence header indices included in two encoded video streams associated with the same content title, a content player can efficiently switch between the encoded video streams by identifying the appropriate switch points in the sequence header indices. When switching between a currently playing encoded video stream and a new encoded video stream, a content player, such as the content player 108, searches the sequence header index included in the new encoded video stream to locate the particular switch point specifying the playback offset associated with the next GOP to be played. The content player can then switch to the new encoded video stream and download the GOP stored in the data packet specified at the particular switch point for playback. For example, for encoded video streams where each GOP were associated with a playback time interval of three seconds, if the first GOP associated with the playback offset of zero seconds were currently being played, then the next GOP to be played would be associated with the playback offset of three seconds. In such a scenario, the content player searches the sequence header associated with the new encoded stream for the particular switch point specifying a playback offset of three seconds. Once locating the particular switch point, the content player would download the GOP stored in the data packet specified in the switch point for playback.

In practice, a GOP may include multiple scenes or portions of a scene. For the sake of simplicity, with respect to the current invention, the discussion set forth below focuses on particular scenes within an encoded video stream rather than the GOPs within the encoded video stream. While a content player, such as content player 108, may switch between different encoded video streams based on the GOP boundaries defined by the corresponding sequence header indices, the switching process takes into account the complexities of the different scenes included within the GOP. This switching process is described in further detail below.

Figure 3:
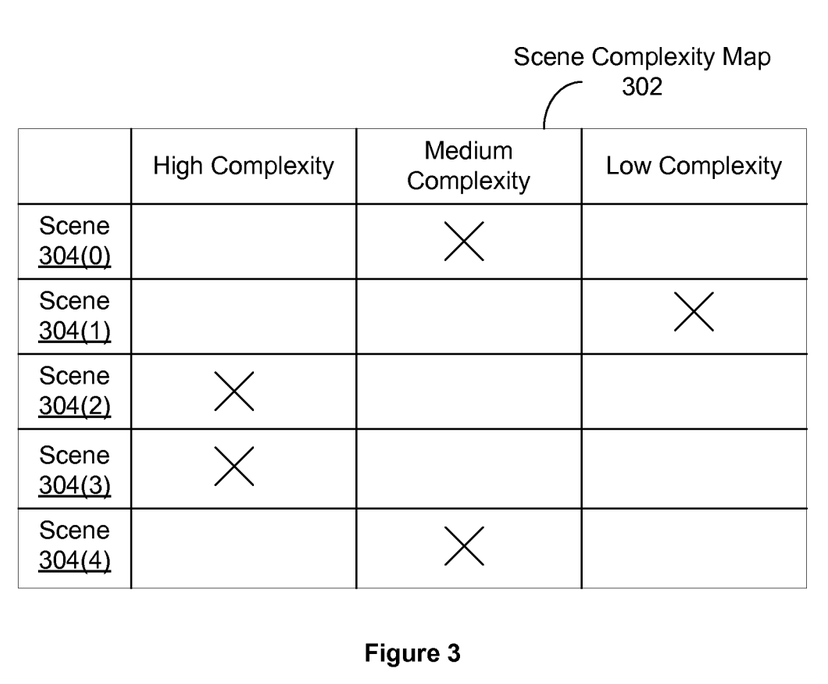
FIG. 3 is an illustration of a scene complexity map generated by the complexity map generator of FIG. 2, according to one embodiment of the invention.

FIG. 3 is an illustration of a scene complexity map 302 generated by the complexity map generator 214 of FIG. 2, according to one embodiment of the invention. As shown, the scene complexity map 302 specifies the complexity level of different scenes 304 within a video stream. For example, scene 304(0) and 304(4) each has a medium scene complexity, scene 304(1) has a low scene complexity and scene 304(2) and 304(3) each has a high scene complexity. Other embodiments of the scene complexity map 302 are also contemplated by this invention. In alternate embodiments, the scene complexity levels may be numeric-based and/or be more granular. For the purposes of this invention, a scene complexity map 302 specifies a scene complexity level for each scene in a video stream, where a particular scene corresponds to a specific set of frames within the video stream.

Figure 4:
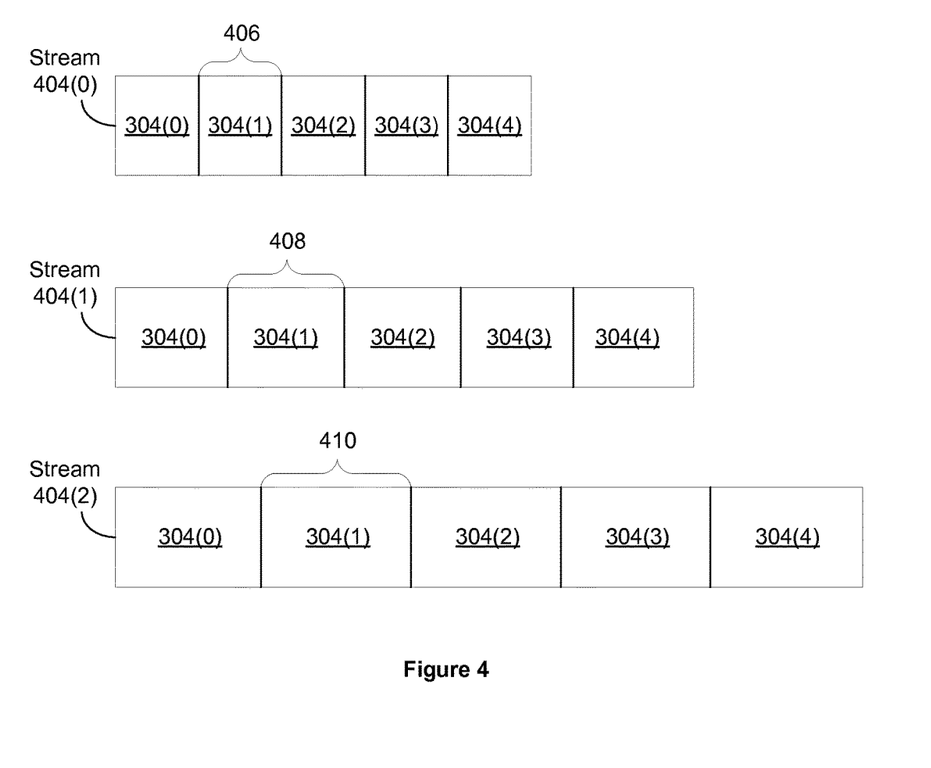
FIG. 4 is an illustration of different video streams generated by the video stream encoder, according to one embodiment of the invention.

FIG. 4 is an illustration of different encoded video streams 404 generated by the video stream encoder 216, according to one embodiment of the invention. As shown, each encoded video stream 404 is associated with the same title and includes the scenes 304 illustrated in FIG. 3. Further, each encoded video stream 404 is encoded to a different bit rate. Encoded video stream 404(0) is encoded to bit rate that is lower than the bit rate of encoded video stream 404(1). Similarly, encoded video stream 404(1) is encoded to bit rate that is lower than the bit rate of encoded video stream 404(2). As also shown, the bit allocation every scene 304 in each encoded video stream 404 is constant. For example, each scene 304 within encoded video stream 404(0) has a bit allocation identified by bit allocation 406. Similarly, each scene 304 within encoded video stream 404(1) has a bit allocation identified by bit allocation 408, and each scene 304 within encoded video stream 404(2) has a bit allocation identified by bit allocation 410. Importantly, the bit allocations 406, 408 and 410 vary according to the bit rate associated with the corresponding encoded video stream 404, where bit allocation 406 is smaller than bit allocation 408 and bit allocation 408 is smaller than bit allocation 410.

Figure 5:
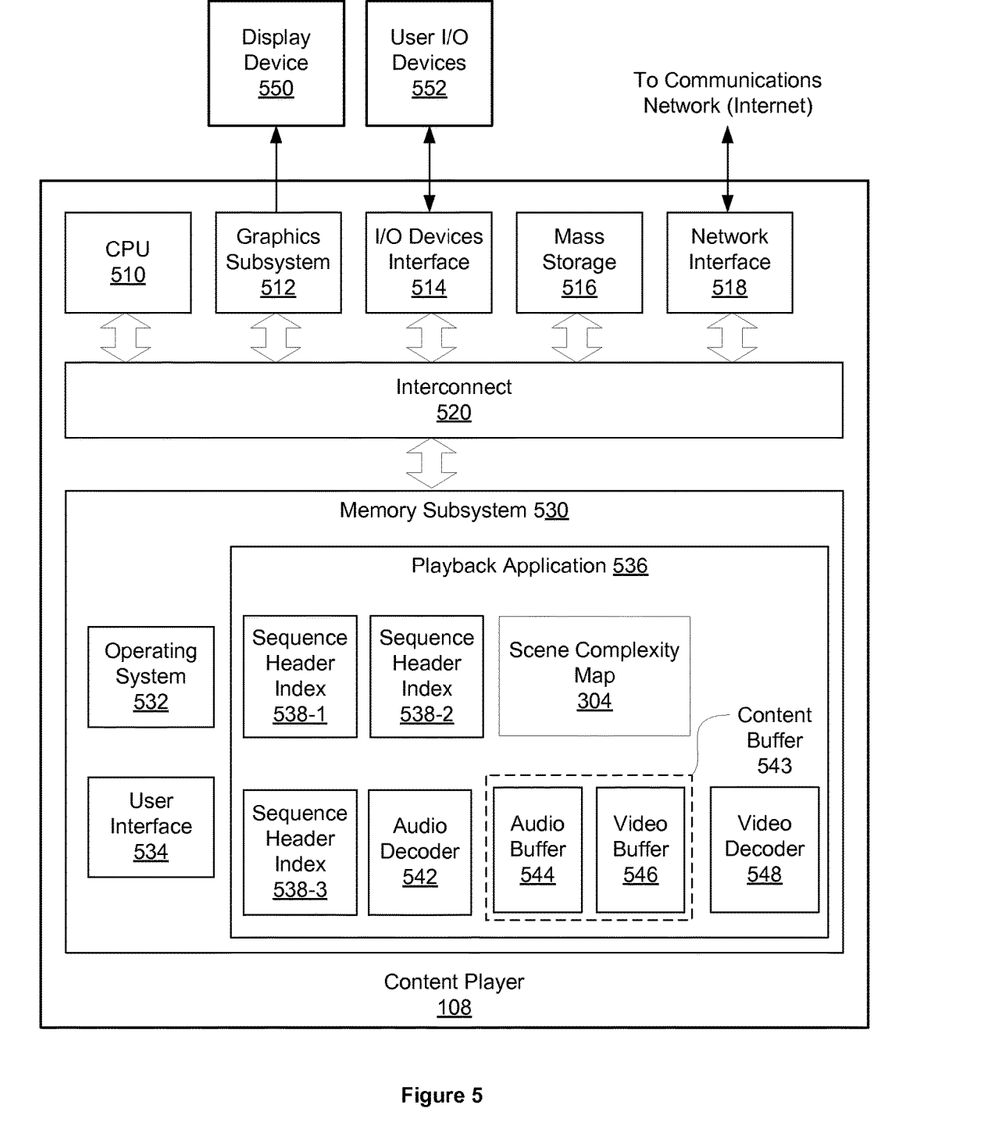
FIG. 5 is a more detailed view of the content player of FIG. 1, according to one embodiment of the invention.

FIG. 5 is a more detailed view of the content player 108 of FIG. 1, according to one embodiment of the invention. As shown, the content player 108 includes, without limitation, a central processing unit (CPU) 510, a graphics subsystem 512, an input/output (I/O) device interface 514, a network interface 518, an interconnect 520, and a memory subsystem 530. The content player 108 may also include a mass storage unit 516.

The CPU 510 is configured to retrieve and execute programming instructions stored in the memory subsystem 530. Similarly, the CPU 510 is configured to store and retrieve application data residing in the memory subsystem 530. The interconnect 520 is configured to facilitate transmission of data, such as programming instructions and application data, between the CPU 510, graphics subsystem 512, I/O devices interface 514, mass storage 516, network interface 518, and memory subsystem 530.

The graphics subsystem 512 is configured to generate frames of video data and transmit the frames of video data to display device 550. In one embodiment, the graphics subsystem 512 may be integrated into an integrated circuit, along with the CPU 510. The display device 550 may comprise any technically feasible means for generating an image for display. For example, the display device 550 may be fabricated using liquid crystal display (LCD) technology, cathode-ray technology, and light-emitting diode (LED) display technology (either organic or inorganic). An input/output (I/O) device interface 514 is configured to receive input data from user I/O devices 552 and transmit the input data to the CPU 510 via the interconnect 520. For example, user I/O devices 552 may comprise one of more buttons, a keyboard, and a mouse or other pointing device. The I/O device interface 514 also includes an audio output unit configured to generate an electrical audio output signal. User I/O devices 552 includes a speaker configured to generate an acoustic output in response to the electrical audio output signal. In alternative embodiments, the display device 550 may include the speaker. A television is an example of a device known in the art that can display video frames and generate an acoustic output. A mass storage unit 516, such as a hard disk drive or flash memory storage drive, is configured to store non-volatile data. A network interface 518 is configured to transmit and receive packets of data via the communications network 150. In one embodiment, the network interface 518 is configured to communicate using the well-known Ethernet standard. The network interface 518 is coupled to the CPU 510 via the interconnect 520.

The memory subsystem 530 includes programming instructions and data that comprise an operating system 532, user interface 534, and playback application 536. The operating system 532 performs system management functions such as managing hardware devices including the network interface 518, mass storage unit 516, I/O device interface 514, and graphics subsystem 512. The operating system 532 also provides process and memory management models for the user interface 534 and the playback application 536. The user interface 534 provides a specific structure, such as a window and object metaphor, for user interaction with content player 108. Persons skilled in the art will recognize the various operating systems and user interfaces that are well-known in the art and suitable for incorporation into the content player 108.

The playback application 536 is configured to retrieve digital content from the CDN 106 via the network interface 518 and play the digital content through the graphics subsystem 512. The graphics subsystem 512 is configured to transmit a rendered video signal to the display device 550. In normal operation, the playback application 536 receives a request from a user to play a specific title. The playback application 536 then identifies the different encoded video streams associated with the requested title, wherein each encoded video stream is encoded to a different playback bit rate. After the playback application 536 has located the encoded video streams associated with the requested title, the playback application downloads sequence header indices associated with each encoded video stream associated with the requested title from the CDN 106. As previously described herein, a sequence header index associated with an encoded video stream includes information related to the encoded sequence included in the digital content file.

In one embodiment, the playback application 536 begins downloading the digital content file associated with the requested title comprising the encoded sequence encoded to the lowest playback bit rate to minimize startup time for playback. For the purposes of discussion only, the digital content file is associated with the requested title and comprises the encoded sequence encoded to the lowest playback bit rate. The requested digital content file is downloaded into the content buffer 543, configured to serve as a first-in, first-out queue. In one embodiment, each unit of downloaded data comprises a unit of video data or a unit of audio data. As units of video data associated with the requested digital content file are downloaded to the content player 108, the units of video data are pushed into the content buffer 543. Similarly, as units of audio data associated with the requested digital content file are downloaded to the content player 108, the units of audio data are pushed into the content buffer 543. In one embodiment the units of video data are stored in video buffer 546 within the content buffer 543, and units of audio data are stored in audio buffer 544, also within the content buffer 543.

A video decoder 548 reads units of video data from the video buffer 546, and renders the units of video data into a sequence of video frames corresponding in duration to the fixed span of playback time. Reading a unit of video data from the video buffer 546 effectively de-queues the unit of video data from the video buffer 546 (and from the content buffer 543). The sequence of video frames is processed by graphics subsystem 512 and transmitted to the display device 550.

An audio decoder 542 reads units of audio data from the audio buffer 544, and renders the units of audio data into a sequence of audio samples, generally synchronized in time with the sequence of video frames. In one embodiment, the sequence of audio samples is transmitted to the I/O device interface 514, which converts the sequence of audio samples into the electrical audio signal. The electrical audio signal is transmitted to the speaker within the user I/O devices 552, which, in response, generates an acoustic output.

Given the bandwidth limitations of the communications network 150, the playback application 536 may download consecutive portions of video data from different constant bit rate encoded video streams based on scene complexities. In operation, when playback is initiated, the playback application 536 receives the scene complexity map 302 associated with the digital video to be played. As previously described, the scene complexity map 302 specifies the complexity level of different scenes of the digital video. When selecting a next portion of video data for download, the playback application 536 determines the complexity level of the scene(s) included in the portion of the video data based on the scene complexity map 302. Based on the complexity level of the scene(s) and one or more performance factors, the playback application 536 then determines the particular encoded video stream from which to download the portion of the video data. For example, in a scenario where the bandwidth is low, if the scene(s) are of low complexity, then the playback application 536 downloads the portion of video data including the scenes from an encoded video stream encoded to low bit rate. In this manner, bandwidth of the communications network 150 may be effectively managed by the playback application 536 to download subsequent portions of the higher bit rate encoded video stream for higher complexity scenes. In such a scenario, less bandwidth is used to download low complexity scenes compared with medium complexity scenes, and bandwidth is advantageously conserved in order to download portions of medium or high bit rate encoded video streams for portions of the video data including scenes of high complexity. In contrast, a conventional content player simply selects one of the variable bit rate encoded video streams based on the available bandwidth, without accounting for the complexity of the scene that is encoded in that particular portion of the variable bit rate video stream.

Other performance factors, apart from the complexity levels of the scenes included in a portion of video data, that may influence the specific encoded stream from which to download the portion of video data include complexity levels of subsequent scenes of the video data, the buffer size of the video buffer 546, the behavior of the end-user viewing the video content, the type of display being generated (high-definition, standard-definition, etc) and the available lead time. These factors combined with the bandwidth limitations of the communications network 150 may be used to determine a specific encoded video stream from which to download each portion of the video data based on the complexity levels of the scenes included in the portion of the video data. In such a manner, a variable bit rate video stream is generated from different constant bit rate encoded video streams.

In an alternate embodiment, only portions of video data that include scenes of high complexity are encoded to a high bit rate. Similarly, only portions of video data that include scenes of medium or high complexity are encoded to a medium bit rate. Portions of video data that only include scenes of low complexity are only encoded to a low bit rate. Referring back to FIG. 4, the medium bit rate encoded level of the video stream, encoded video stream 404(1) would not include scene 304(1) and the high bit rate encoded level of the video stream, encoded video stream 404(2) would not include scene 304(0), 304(1), and 304(4). In such an embodiment, the playback application 536 may download only portions of video data including scenes of high complexity of encoded video streams encoded to high bit rates and all other portions of video data from encoded video streams encoded to lower bit rates.

Figure 6:
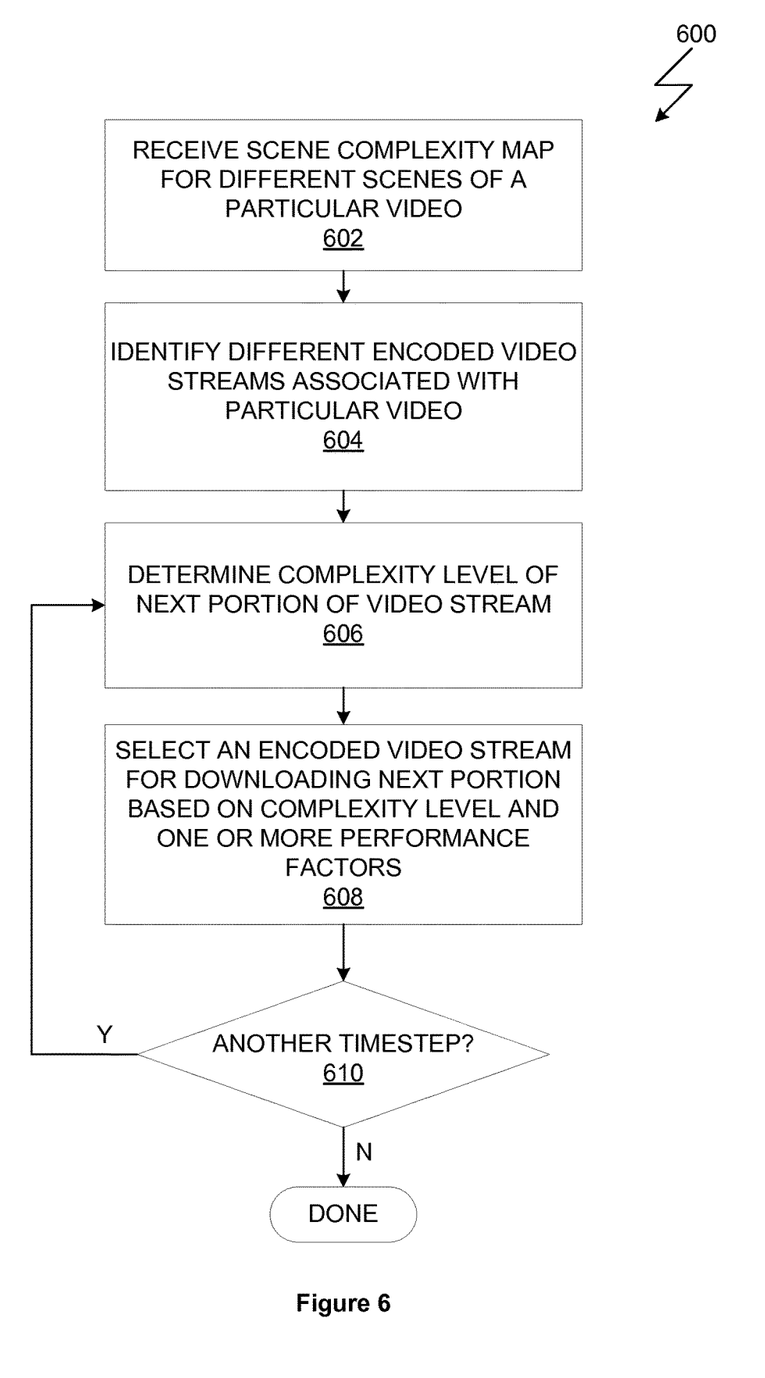
FIG. 6 is a flow diagram of method steps for selecting a next scene for playback from one of a plurality of video streams based on scene complexity, according to one embodiment of the invention.

FIG. 6 is a flow diagram of method steps for selecting a next scene for playback from one of a plurality of video streams based on scene complexity, according to one embodiment of the invention. Although the method steps are described in conjunction with the systems for FIGS. 1-5, persons skilled in the art will understand that any system configured to perform the method steps, in any order, is within the scope of the invention.

At step 602, the playback application 536 receives the scene complexity map 302 associated with the digital video for which playback has been initiated. As previously described, the scene complexity map 302 specifies the complexity level of different scenes of the digital video. At step 604, the playback application 536 identifies a set of encoded video streams associated with the digital video to be played. Each encoded video stream is encoded to a different bit rate, as previously described in conjunction with FIG. 3.

At step 606, the playback application 536 determines, for a next portion of the video data, the complexity level associated with the scene(s) included in the next portion. The complexity level is determined based on the scene complexity map 302 received at step 602. At step 608, the playback application 536 then selects a specific encoded video stream for downloading the next portion of the video data based on the determined complexity level as well as one or more performance factors. As previously described, the performance factors may include bandwidth limitations and the size of the content buffer 543. In order to select the specific encoded video stream, the playback application 536 executing on the content player 108 dynamically determines the encoding level (high, medium, or low bit rate) of the video stream for the next portion of the video data to be downloaded during playback of a different (previous) portion of the digital video content.

At step 610, the playback application 536 determines if another timestep occurs during playback of the video data, and, if so, then the playback application 536 repeats steps 606 and 608 for another portion of the video stream. When another timestep does not occur during the playback of the video data, i.e., playback of the video content is done. The timestep may occur at a constant rate (in seconds or frames) or be triggered based on a fullness or emptiness of the content buffer 543.

One advantage of the disclosed technique is that a variable bit encoded stream is dynamically generated at playback time by selecting portions of video data from different constant bit rate encoded streams based on the complexity levels of the portions of video data. Such a technique allows for optimizing the playback of the video data and generating the highest playback quality video stream based on the current conditions and scene complexities.

Video Stream Selection Based on Bandwidth and Scene Complexity

The selection of a video stream to be downloaded may vary based on bandwidth limitations between the content player 108 and the encoding server 102. In some cases, the scene complexity map is used by the content player 108 to download scenes of lower scene complexity levels from video streams encoded to lower constant bit rates to allow for the subsequent downloading of scenes of higher complexity levels from video streams encoded to higher constant bit rates. In other words, the quality of the encoded video downloaded for some scenes may be compromised (downloaded at a lower bit rate) in order to download a higher quality of encoded video for subsequent scenes that are encoded at a higher bit rate. The objective is to balance the quality level over several scenes so that scenes of higher complexity are downloaded at a higher bit rate compared with scenes of lower complexity. A performance factor that is used to select the bit rate of the encoded video for download may include a maximum tolerable quality degradation. For example, the maximum tolerable quality degradation may be a single level, so that a scene of high complexity may be downloaded at a high or medium bit rate, but not at a low bit rate.

The content player 108 may determine the estimated bandwidth by sampling the actual bandwidth between the content player 108 and the encoding server 102. The estimated bandwidth is an estimate of the actual bandwidth for a future time window. For example, the estimated bandwidth may be determined based on a history of the actual bandwidth for a portion of the video data or a time window. The duration of the time window may be fixed or programmed to be as small as a single frame or as large as multiple GOPs. The estimated bandwidth may be computed as the average of samples of the actual bandwidth during one or more previous time windows. Alternatively, the estimated bandwidth may be computed using a function, where the actual bandwidth samples during the time window are an input to the function. The actual bandwidth between the content player 108 and the encoding server 102 may be sampled hundreds, thousands, or any number of times during a time window.

In addition to computing the estimate bandwidth, the bandwidth variability may also be determined as the variability of the actual bandwidth relative to the estimated bandwidth and represented as a deviation value, e.g., number of standard deviations from the estimated bandwidth. At various points in time during a time window, the actual bandwidth may vary from at or near zero to the high bit rate or even higher than the high bit rate. In particular video content streamed via satellite may have a large amount of bandwidth variability and a correspondingly high deviation value. In other cases, the actual bandwidth may vary by small amounts and the bandwidth variability will have a correspondingly low deviation value. At the beginning of a new streaming session, the estimated bandwidth and bandwidth variability may be initialized to a value based on the behavior from a previous session. The computed estimated bandwidth and one or more of the scene complexity and bandwidth variability may be used to select an encoded video stream at a particular fixed bit rate for download to optimize the quality of the digital content received by the content player 108.

Figure 7:
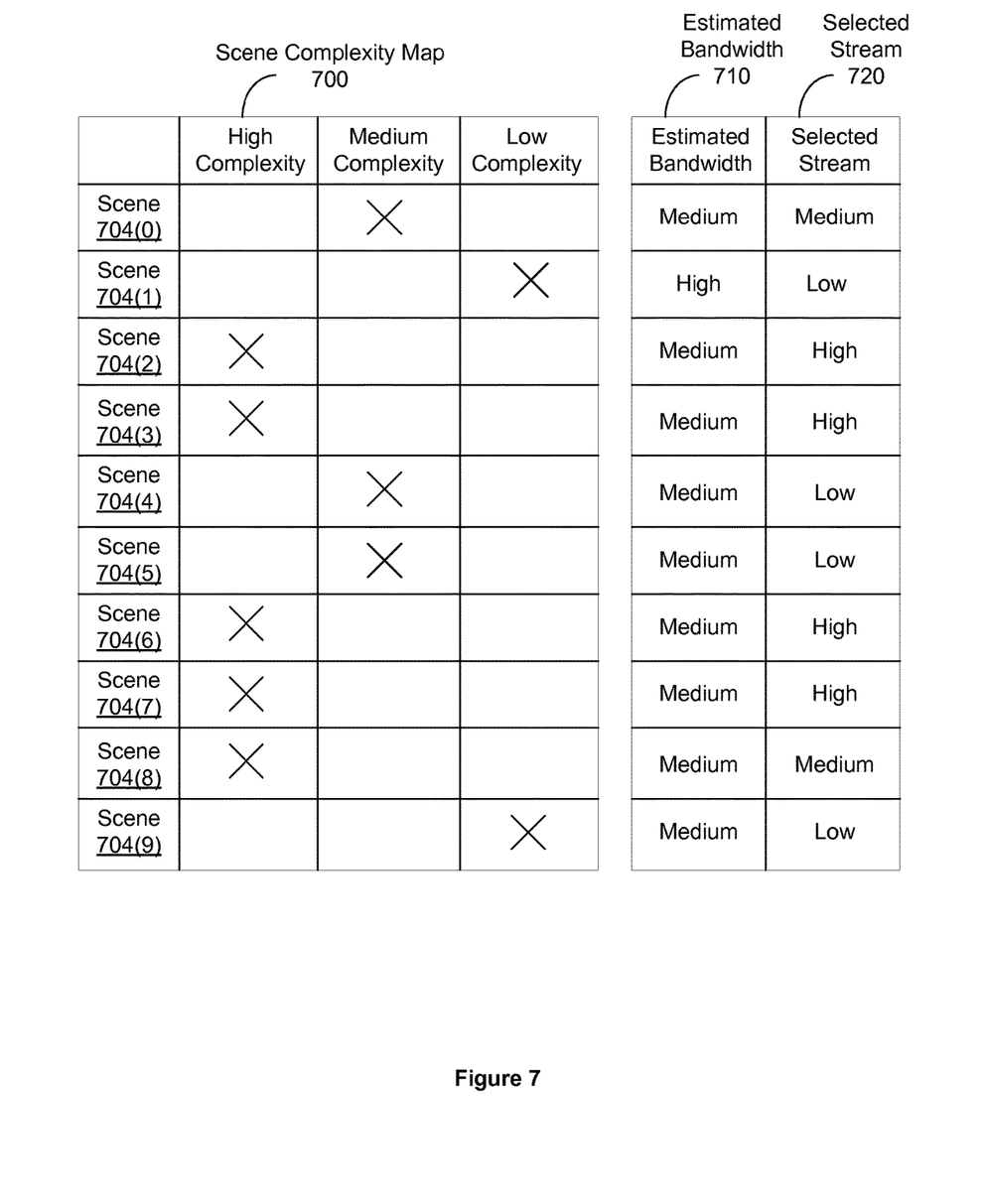
FIG. 7 is an illustration of a scene complexity map generated by the complexity map generator of FIG. 2, estimated bandwidth, and selected encoded video streams, according to one embodiment of the invention.

FIG. 7 is an illustration of a scene complexity map 700 generated by the complexity map generator 214 of FIG. 2, according to one embodiment of the invention. The estimated bandwidth 710 and the selected stream 720, i.e., the portions of fixed rate video streams that are selected for each scene to generate the variable bit rate video stream, are also shown in FIG. 7.

As shown, the scene complexity map 700 specifies the complexity level of different scenes 704 within a video stream. For example, scene 704(0), 704(4), and 704(5) each has a medium scene complexity, scene 704(1) and 704(9) each has a low scene complexity, and scene 704(2), 704(3), 704(6), 704(7), and 704(8) each has a high scene complexity. Other embodiments of the scene complexity map 700 are also contemplated by this invention. In alternate embodiments, the scene complexity levels may be numeric-based and/or be more granular. For the purposes of the embodiments of the invention described herein, a scene complexity map 700 specifies a scene complexity level for each scene in a video stream, where a particular scene corresponds to a specific set of frames within the video stream.

As described above, different encoded video streams are generated by the video stream encoder 216, according to one embodiment of the invention. Each encoded video stream is associated with the same title and includes the scenes 704 illustrated in FIG. 7. Further, each encoded video stream is encoded to a different fixed bit rate, e.g., low, medium, and high fixed bit rates. In an alternate embodiment, only portions of video data that include scenes of high complexity are encoded to a high bit rate. Similarly, only portions of video data that include scenes of medium or high complexity are encoded to a medium bit rate. Portions of video data that only include scenes of low complexity are only encoded to a low bit rate. Therefore, the high and medium encoded video streams may not include all of the scenes 704 that are illustrated in FIG. 7. For example, the high and medium encoded video streams may not include scenes 704 (1) and 704(9).

The estimated bandwidth 710 between the content player 108 and the encoding server 102 is determined by the content player 107 for each time window, where a time window corresponds to a scene 704. The estimated bandwidth for each scene may be computed to be low, medium, or high corresponding to the scene complexities of low, medium, and high, respectively. The estimated bandwidth associated with scene 704(0) is medium and the complexity of scene 704(0) is also medium, so scene 704(0) can be downloaded at the medium fixed bit rate.

The estimated bandwidth 710 associated with scene 704 (1) is high and the complexity of scene 704(1) is low, so scene 704(1) can be downloaded at the low, medium, or high fixed bit rate. Since the complexity of scene 704(1) is low, scene 704(1) is downloaded at the low fixed bit rate (as shown in selected stream 720). During the time window corresponding to the scene 704(1) additional encoded video data may be downloaded, so scene 704(2) having a complexity that is high is also downloaded. Scene 704(2) is downloaded at a high fixed bit rate during the time window corresponding to scene 704(1).

The estimated bandwidth 710 associated with scene 704 (2) and 704(3) is medium, so scene 704(3) may be downloaded at a high fixed bit rate during the time windows corresponding to scenes 704(2) and 704(3). The estimated bandwidth associated with scenes 704(4), 704(5), 704(6), 704(7), 704(8), and 704(9) is medium. In order to download at least scenes 704(6) and 704(7) at a high fixed bit rate, the low fixed bit rate encoded video streams are selected for scenes 704(4) and 704(5) (see the selected stream 720). The low fixed bit rate encoded video streams are downloaded for scenes 704(4) and 704(5) during the time window corresponding to scene 704(4). The high fixed bit rate encoded video streams are then selected and downloaded for scenes 704(6) and 704(7) during the time windows corresponding to scene 704(5), scene 704(6), and 704(7). Because scenes 704(4) and 704(5) are downloaded at a lower bit rate, scenes 704(6) and 704(7) may be downloaded at a higher bit rate.

Finally, the medium fixed bit rate encoded video stream is selected for downloading scene 704(8) since the estimated bandwidth is medium. The low fixed bit rate encoded video stream is selected for downloading scene 704(9) since scene 704(9) has a low complexity. Any surplus bandwidth during the time window associated with scene 704(9) may be used to download a video stream for a subsequent scene.

Figure 8:
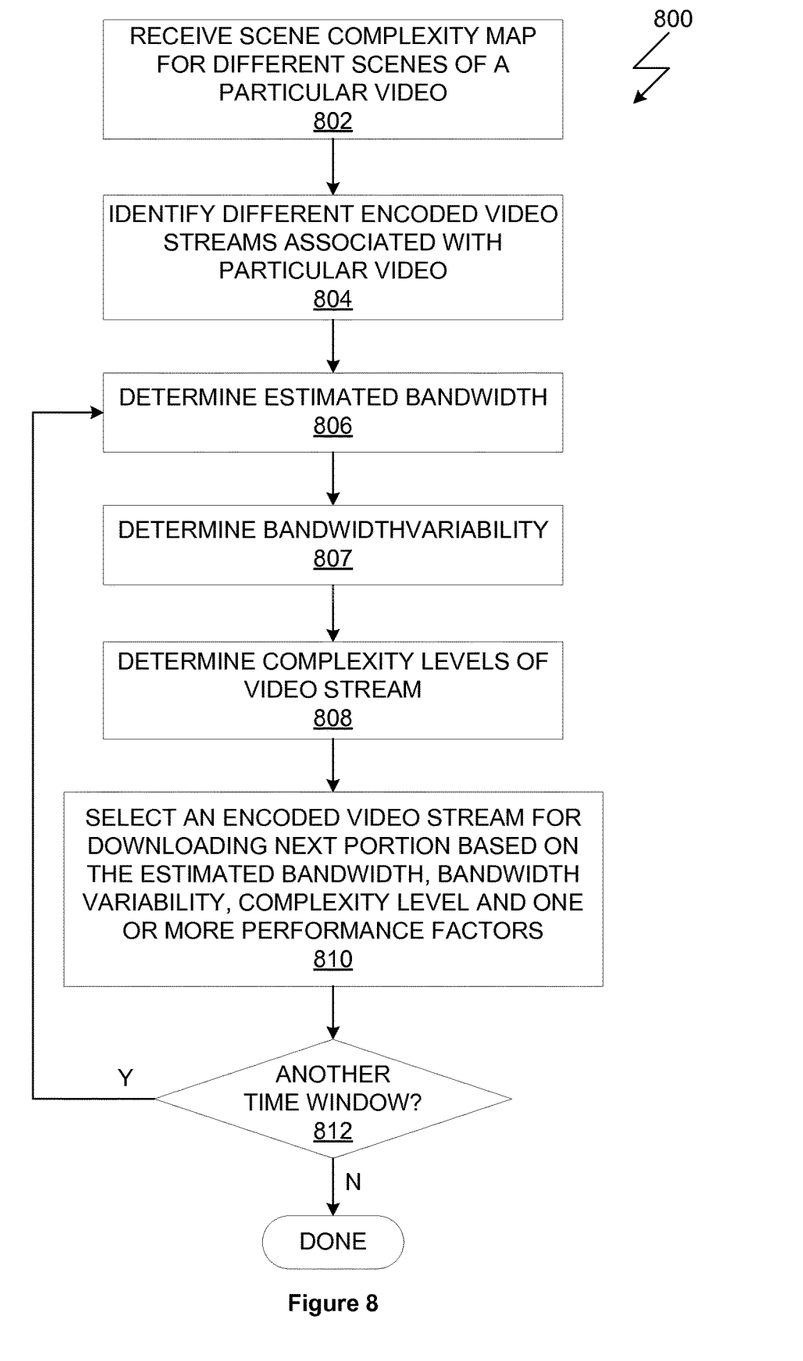
FIG. 8 is a flow diagram of method steps for selecting encoded video streams for playback from one of a plurality of video streams based on scene complexity and estimated bandwidth, according to one embodiment of the invention.

FIG. 8 is a flow diagram of method steps 800 for selecting encoded video streams for playback from one of a plurality of video streams based on scene complexity and estimated bandwidth, according to one embodiment of the invention. Although the method steps 800 are described in conjunction with the systems for FIGS. 1-7, persons skilled in the art will understand that any system configured to perform the method steps, in any order, is within the scope of the invention.

At step 802, the playback application 536 receives the scene complexity map 302 associated with the digital video for which playback has been initiated. As previously described, the scene complexity map 700 specifies the complexity level of different scenes of the digital video. At step 804, the playback application 536 identifies a set of encoded video streams associated with the digital video to be played. Each encoded video stream is encoded to a different fixed bit rate, as previously described in conjunction with FIGS. 3 and 7.

At step 806, the playback application 536 computes, for a next time window, the estimated bandwidth for downloading the encoded video streams from the encoding server 102 to the content player 108. The estimated bandwidth is an estimation that is computed based on the actual bandwidth over one or more previous time windows. At step 807, the playback application 536 computes, for a next time window, the bandwidth variability of the actual bandwidth relative to the estimated bandwidth. The bandwidth variability is computed based on the actual bandwidth over one or more previous time windows and the estimated bandwidth.

At step 808, the playback application 536 determines, for the next one or more time windows, the complexity level associated with the scene(s). Looking ahead by more than one time window allows the playback application 536 to balance the quality level of the video over several scenes based on the estimated bandwidth so that scenes of higher complexity are downloaded at a higher bit rate compared with scenes of lower complexity. The complexity level is determined based on the scene complexity map 700 received at step 802. At step 810, the playback application 536 then selects a specific encoded video stream for downloading the next portion of the video data based on the computed estimated bandwidth, the computed bandwidth variability, and the determined complexity level as well as one or more performance factors. The performance factors may include the size of the content buffer 543 and a maximum tolerable quality degradation. In order to select the specific encoded video stream, the playback application 536 executing on the content player 108 dynamically determines the encoding level (high, medium, or low bit rate) of the video stream for the next portion of the video data to be downloaded during playback of a different (previous) portion of the digital video content.

At step 812, the playback application 536 determines whether another time window occurs during playback of the video data, and, if so, then the playback application 536 repeats steps 806, 808, and 810 for another portion of the video stream. When another time window does not occur during the playback of the video data, i.e., playback of the video content terminates. The time window may occur at a constant rate (in seconds, frames, or GOPs) or be triggered based on a fullness or emptiness of the content buffer 543.

In one embodiment, the playback application 536 downloads the video stream at the low bit rate for one or more time windows to ensure that at least the low bit rate encoded video stream is available in a first portion of the video buffer 546. Whenever the low bit rate encoded video stream is selected for a time window at step 810, the playback application 536 does not download the low bit rate encoded video stream for the time window since that data is already stored in the first portion of the video buffer 546. When, at step 810 the medium or high bit rate encoded video stream is selected for a time window, the playback application 546 download the selected encoded video stream to a second portion of the video buffer 546.

One advantage of the disclosed technique is that a variable bit encoded stream is dynamically generated at playback time by selecting portions of video data from different constant bit rate encoded streams based on the estimated bandwidth for downloading the encoded video data and complexity levels of the portions of video data. Such a technique allows for optimizing the playback of the video data based on the available download bandwidth, bandwidth variability, and scene complexities.

In one embodiment of the invention the content player 108 comprises an embedded computer platform such as a set top box. An alternative embodiment of the invention may be implemented as a program product that is downloaded to a memory within a computer system, for example as executable instructions embedded within an internet web site. In this embodiment, the content player 108 comprises the computer system.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

I claim:

1. A method, comprising:
computing a first estimated bandwidth available for downloading digital content from one or more content servers during a first time window and a second estimated available bandwidth available for downloading the digital content from the one or more content servers during a second time window based on actual bandwidths that were available for downloading the digital content from the one or more content servers during one or more previous time windows;

computing a bandwidth variability based on the actual bandwidths available during the one or more previous time windows and estimated bandwidths computed for the one or more previous time windows;

determining from a scene complexity map a first complexity level for the digital content within the first time window and a second complexity level for the digital content within the second time window; and selecting a first encoded portion of the digital content to download for playback during the first time window from a first content stream included in a plurality of encoded content streams, wherein each encoded content stream comprises the digital content encoded at a different bit rate, and the first content stream is encoded at a first bit rate, and wherein the first encoded portion is selected based on the first estimated bandwidth available during the first time window, the second estimated bandwidth available during the second time window, the bandwidth variability, and a desired bit rate at which a second encoded portion of the digital content to be downloaded subsequent to the first encoded portion is encoded.

2. The method of claim 1, wherein the first estimated bandwidth available during the first time window comprises a high-level bandwidth value, the first complexity level comprises a low-level complexity, the second estimated bandwidth available during the second window comprises a mid-level bandwidth value, the second complexity level comprises a high-level complexity, the desired bit rate at which the second encoded portion is encoded comprises a high-level bit rate, and the first encoded content stream from which first encoded portion is selected is encoded at a low-level bit rate.

3. The method of claim 2, further comprising downloading the first encoded portion during the first time window, selecting the second encoded portion of the digital content from a second encoded content stream included in the plurality of encoded content streams that is encoded at a high-level bit rate, and downloading at least a portion of the second encoded portion during the first time window.

4. The method of claim 1, wherein the first estimated bandwidth available during the first time window comprises a mid-level bandwidth value, the first complexity level comprises a mid-level complexity, the second estimated bandwidth available during the second window comprises a mid-level bandwidth value, the second complexity level comprises a high-level complexity, the desired bit rate at which the second encoded portion is encoded comprises a high-level bit rate, and the first encoded content stream from which first encoded portion is selected is encoded at a low-level bit rate.

5. The method of claim 4, further comprising downloading at least a portion of the first encoded portion during a time window that immediately precedes the first time window, selecting the second encoded portion of the digital content from a second encoded content stream included in the plurality of encoded content streams that is encoded at a high-level bit rate, and downloading at least a portion of the second encoded portion during the first time window.

6. The method of claim 1, wherein the first estimated bandwidth available during the first time window comprises a mid-level bandwidth value, the first complexity level comprises a mid-level complexity, the second estimated bandwidth available during the second window comprises a high-level bandwidth value, the second complexity level comprises a low-level complexity, and the first encoded content stream from which first encoded portion is selected is encoded at a mid-level bit rate.

7. The method of claim 6, wherein the desired bit rate at which the second encoded portion is encoded comprises either high-level bit rate, a mid-level bit rate, or a low-level bit rate, and further comprising downloading the first encoded portion during the first time window, selecting the second encoded portion of the digital content from a second encoded content stream included in the plurality of encoded content streams that is encoded at the desired bit rate, and downloading the second encoded portion during the second time window.

8. The method of claim 1, wherein the digital content comprises digital video content associated with a movie title.

9. A non-transitory computer-readable medium including instructions that, when executed by a processor, cause the processor to download digital content from one or more content servers, by performing the steps of:

computing a first estimated bandwidth available for downloading digital content from the one or more content servers during a first time window and a second estimated available bandwidth available for downloading the digital content from the one or more content servers during a second time window based on actual bandwidths that were available for downloading the digital content from the one or more content servers during one or more previous time windows;

determining from a scene complexity map a first complexity level for the digital content within the first time window and a second complexity level for the digital content within the second time window; and selecting a first encoded portion of the digital content to download for playback during the first time window from a first content stream included in a plurality of encoded content streams, wherein each encoded content stream comprises the digital content encoded at a different bit rate, and the first content stream is encoded at a first bit rate, and wherein the first encoded portion is selected based on the first estimated bandwidth available during the first time window, the second estimated bandwidth available during the second time window, and a desired bit rate at which a second encoded portion of the digital content to be downloaded subsequent to the first encoded portion is encoded.

10. The non-transitory computer-readable medium of claim 9, wherein the first estimated bandwidth available during the first time window comprises a high-level bandwidth value, the first complexity level comprises a low-level complexity, the second estimated bandwidth available during the second window comprises a mid-level bandwidth value, the second complexity level comprises a high-level complexity, the desired bit rate at which the second encoded portion is encoded comprises a high-level bit rate, and the first encoded content stream from which first encoded portion is selected is encoded at a low-level bit rate.

11. The non-transitory computer-readable medium of claim 10, further comprising downloading the first encoded portion during the first time window, selecting the second encoded portion of the digital content from a second encoded content stream included in the plurality of encoded content streams that is encoded at a high-level bit rate, and downloading at least a portion of the second encoded portion during the first time window.

12. The non-transitory computer-readable medium of claim 9, wherein the first estimated bandwidth available during the first time window comprises a mid-level bandwidth value, the first complexity level comprises a mid-level complexity, the second estimated bandwidth available during the second window comprises a mid-level bandwidth value, the second complexity level comprises a high-level complexity, the desired bit rate at which the second encoded portion is encoded comprises a high-level bit rate, and the first encoded content stream from which first encoded portion is selected is encoded at a low-level bit rate.

13. The non-transitory computer-readable medium of claim 12, further comprising downloading at least a portion of the first encoded portion during a time window that immediately precedes the first time window, selecting the second encoded portion of the digital content from a second encoded content stream included in the plurality of encoded content streams that is encoded at a high-level bit rate, and downloading at least a portion of the second encoded portion during the first time window.

14. The non-transitory computer-readable medium of claim 9, wherein the first estimated bandwidth available during the first time window comprises a mid-level bandwidth value, the first complexity level comprises a mid-level complexity, the second estimated bandwidth available during the second window comprises a high-level bandwidth value, the second complexity level comprises a low-level complexity, and the first encoded content stream from which first encoded portion is selected is encoded at a mid-level bit rate.

15. The non-transitory computer-readable medium of claim 14, wherein the desired bit rate at which the second encoded portion is encoded comprises either high-level bit rate, a mid-level bit rate, or a low-level bit rate, and further comprising downloading the first encoded portion during the first time window, selecting the second encoded portion of the digital content from a second encoded content stream included in the plurality of encoded content streams that is encoded at the desired bit rate, and downloading the second encoded portion during the second time window.

16. The non-transitory computer-readable medium of claim 9, wherein the digital content comprises digital video content associated with a movie title.

17. The non-transitory computer-readable medium of claim 9, further comprising computing a bandwidth variability based on the actual bandwidths available during the one or more previous time windows and estimated bandwidths computed for the one or more previous time windows, wherein the first encoded portion is also selected based on the bandwidth variability.

18. A computing device, comprising:
a processor; and
a memory that stores a scene complexity map and a playback application,
wherein the scene complexity map specifies complexity levels for different scenes included in digital content stored on one or more content servers, and
wherein the playback engine, when executed by the processor, is configured to:
    compute a first estimated bandwidth available for downloading the digital content from the one or more content servers during a first time window and a second estimated available bandwidth available for downloading the digital content from the one or more content servers during a second time window based on actual bandwidths that were available for downloading the digital content from the one or more content servers during one or more previous time windows;
    determine from the scene complexity map a first complexity level for the digital content within the first time window and a second complexity level for the digital content within the second time window; and
    selecting a first encoded portion of the digital content to download for playback during the first time window from a first content stream included in a plurality of encoded content streams,
    wherein each encoded content stream comprises the digital content encoded at a different bit rate, and the first content stream is encoded at a first bit rate, and
    wherein the first encoded portion is selected based on the first estimated bandwidth available during the first time window, the second estimated bandwidth available during the second time window, and a desired bit rate at which a second encoded portion of the digital content to be downloaded subsequent to the first encoded portion is encoded.

19. The computing device of claim 18, wherein the scene complexity map is generated by a complexity map generator residing on one of the one or more content servers.

20. The computing device of claim 18, wherein the playback engine is further configured to compute a bandwidth variability based on the actual bandwidths available during the one or more previous time windows and estimated bandwidths computed for the one or more previous time windows, and wherein the playback engine is further configured to select the first encoded portion based on the bandwidth variability.

* * * * *